Figure 1:
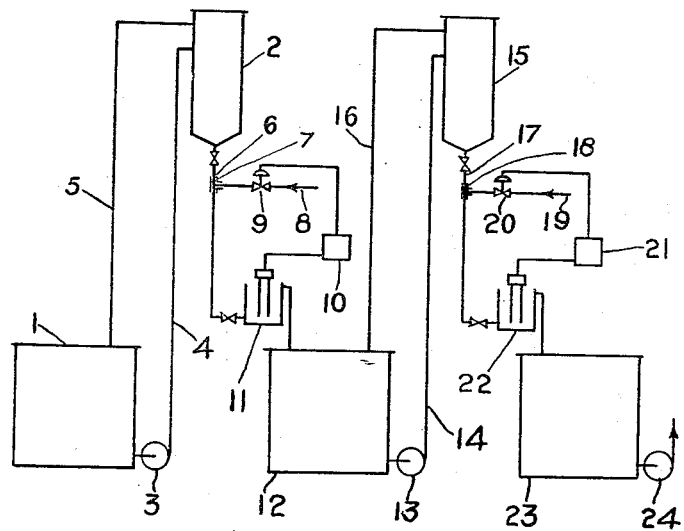

July 27, 1954

H. TAYLOR 2,684,960

METHOD OF ISOLATING PROTEIN FROM
PROTEIN CONTAINING MATERIAL
Filed June 19, 1952

INVENTOR:

Henry Taylor,
BY Cushman, Darby + Cushman
ATTORNEYS.

Patented July 27, 1954

2,684,960

UNITED STATES PATENT OFFICE 2,684,960

METHOD OF ISOLATING PROTEIN FROM PROTEIN CONTAINING MATERIAL

Henry Taylor, Dumfries, Scotland, assignor to Imperial Chemical Industries Limited, a corporation of Great Britain Application June 19, 1952, Serial No. 294,521

Claims priority, application Great Britain September 26, 1951

4 Claims. (Cl. 260—123.5)

The present invention relates to a method of isolating protein from protein containing material.

The usual method of isolation of protein from protein containing material, such as de-oiled groundnut or soya meal is to treat the protein containing material with 0.175 to 0.200 per cent caustic soda, pH 7 to 11.5, separate the insoluble meal from the protein solution by screening, and, after clarification of the solution by known means, to precipitate the protein from the alkali solution by bringing the solution to the isoelectric point of the protein with sulphur dioxide, hydrochloric acid, or sulphuric acid. The protein is thereafter separated from the supernatant liquor, washed with water and then isolated by low speed batch centrifuging and drying, or the protein suspension in water is spray dried.

When the isolated protein is to be used for the production of protein fibre or other purposes it is more economic if the drying of the isolated protein can be avoided by thickening (concentrating) the precipitated protein into a thick cream containing about 20-40 per cent protein. This cream can then be used for making up spinning solution for the production of protein fibre or solution for adhesives, and in this way the evaporation of considerable quantities of water is avoided.

Continuously operating high speed (i. e. 4000 to 5000 revs. per minute) centrifugals have been found particularly useful for the concentration of protein in suspensions containing low concentrations of protein. Using a concentration of 0.175–0.200 per cent caustic soda for the extraction of groundnut protein from groundnut meal and, after filtration of the insolubles, precipitating the protein from the clarified protein liquor in the normal way, that is by addition of sulphur dioxide until the pH of the protein suspension is 5.0, it is possible to produce a smooth 20-40 per cent protein slurry by the use of continuously operated high speed centrifugal machines.

It has been found, however, that the amount of colour developed in the resulting protein when using 0.175–0.200 per cent caustic soda solution for the extraction of protein from groundnut meal is considerably higher than if only 0.1 per cent or less caustic soda solution is used for the extraction.

However, when 0.1 per cent or less caustic soda solution is used for the extraction of groundnut protein from groundnut meal and the clarified protein liquor is precipitated in the normal manner, that is by the addition of sulphur dioxide until the pH of the protein suspension is 5.0, it is impossible to produce a smooth protein slurry by the use of continuously operated high speed centrifugal machines. The protein slurry is invariably discharged from the machine as gritty particles which quickly choke the nozzles of the centrifugal bowl.

The object of the present invention is to provide a method for producing dilute suspensions of precipitated protein from 0.1 per cent or less caustic soda extracted protein from groundnut meal so that these suspensions can be concentrated in continuously operated high speed centrifugal machines to smooth 20-40 per cent protein slurries.

According to the present invention the method of precipitating vegetable globulins from alkaline solutions of vegetable globulins obtained by extraction from groundnut meal with a caustic soda solution having a concentration up to 0.1 per cent comprises bringing the solution to a pH in the region of 3.5 and thereafter adding caustic alkali to bring the mixture to the isoelectric point, a pH in the region of 5.

Preferably the method of precipitating vegetable globulins from alkaline solutions thereof comprises progressively mixing under turbulence small elements of an aqueous solution of vegetable globulin and an acid precipitant to bring the resulting liquor to a pH value below 5 and above 2.5, withdrawing the resulting liquor of precipitated vegetable globulin, controlling the rate of delivery of the said acid precipitant by the pH value of the withdrawn resulting liquor of precipitated vegetable globulin, progressively mixing under turbulence the withdrawn small elements of resulting liquor of precipitated vegetable globulin with caustic alkali so that the resulting liquor attains a pH value in the region of 5 and controlling the rate of delivery of said alkali by the pH of the withdrawn thus treated liquor of precipitated vegetable globulin.

The said acid precipitant is preferably an aqueous solution containing 5-12 per cent hydrochloric acid and an agent suppressing the action of bacteria and enzymes as for example 1 per cent sulphur dioxide. Hydrochloric acid alone may be used for this precipitation process, but since it possesses no bactericidal properties the pH of the protein suspension falls due to bacterial and enzyme action during the two stages of thickening which are carried out subsequently. In order to overcome this difficulty a small proportion of sulphur dioxide is added to the dilute hydrochloric acid. For example, to the 10 per cent hydrochloric acid a minimum of 0.5 per cent sulphur dioxide is added and generally 1 per cent.

The invention is illustrated by the following example and with reference to the diagrammatic drawing accompanying the specification in which Fig. 1 is a sectional elevation of the apparatus suitable for carrying out the method of the present invention.

Clarified protein liquor, pH 8-11, produced by the extraction of groundnut meal with 0.1 per cent caustic soda solution, is contained in tank 1 and is pumped continuously to an overhead constant level tank 2 through pump 3 and pipe 4. The liquor overflows from the constant level tank 2 through pipe 5 back to tank 1. From tank 2 the liquor flows at constant head through pipe 6 to the mixing nozzle 7 into which is introduced from a source of supply through tube 8 and control valve 9 a supply of acidic liquor containing 10 per cent hydrochloric acid and 1 per cent sulphur dioxide. The valve 9 is automatically controlled by a pH cell 10 in a small tank 11 holding the liquor of precipitated protein to give a predetermined pH value of 3.5 of the liquor in tank 11. A pH controller operating with a glass electrode is found to give satisfactory results in the automatic control of this precipitant. The liquor of precipitated protein, pH value 3.5, passes to the larger storage tank 12. From tank 12 the liquor of precipitated protein, pH value 3.5, is pumped continuously through pump 13 and pipe line 14 to an overhead constant level tank 15. The liquor overflows from the constant level tank 15 through pipe 16 back to tank 12. From tank 15 the liquor flows under constant head through pipe 17 to the mixing nozzle 18 into which is introduced from a source of supply through the pipe 19 and control valve 20 a supply of caustic liquor containing 17 per cent caustic soda. The valve 20 is automatically controlled by a pH cell 21 in the small tank 22 holding the liquor of precipitated protein to give a predetermined pH value of 5.0 of the liquor in tank 22. A pH controller operating with a glass electrode is found to give satisfactory results in the automatic control of this precipitation. The slurry of precipitated protein overflows from small tank 22 to the storage tank 23 and is pumped from this tank by pump 24 to the continuously operated high speed centrifugals which thicken the protein slurry.

What I claim is:

1. A process for the production of smooth 20-40% protein slurries of improved color from material containing vegetable globulin and coloring matter of increased solubility in a caustic soda solution having a concentration in excess of 0.1% which comprises extracting the vegetable globulin from said vegetable globulin containing material with a caustic soda solution having a concentration of up to 0.1%, acidifying the solution to a pH of about 3.5, thereafter adding caustic alkali to bring the acidified solution to the isoelectric point and concentrating the mixture so produced in a continuously operated high speed centrifugal machine.

2. A process as recited in claim 1 in which said vegetable globulin containing material is groundnut meal.

3. A process as recited in claim 2 in which acidification is performed by introducing into said solution of vegetable globulin and caustic soda an aqueous solution containing 5 to 12% hydrochloric acid and at least 0.5% sulphur dioxide.

4. A process for the production of smooth 20-40% protein slurries of improved color which comprises extracting the vegetable globulin from groundnut meal with a caustic soda solution having a concentration of up to 0.1% to form an aqueous alkaline solution of vegetable globulin, progressively mixing under turbulence small elements of said alkaline solution with an acid precipitant to bring the resulting liquor to a pH value below the isoelectric point of said alkaline solution and above 2.5, withdrawing the resulting liquor of precipitated vegetable globulin, controlling the rate of delivery of the said acid precipitant by the pH value of the withdrawn resulting liquor, progressively mixing under turbulence small elements of said resulting liquor with caustic alkali so that the liquor so treated attains a pH value of about 5.0 and controlling the rate of delivery of said alkali by the pH of the withdrawn so treated liquor of precipitated vegetable globulin and concentrating the said treated liquor in a continuously operated high speed centrifugal machine.

References Cited in the file of this patent

UNITED STATES PATENTS

| Number | Name | Date |
|---|---|---|
| 2,230,624 | McLeon | Feb. 4, 1941 |
| 2,377,853 | Boyer et al. | June 12, 1945 |

OTHER REFERENCES

Smith et al.: Ind. and Eng. Chem., vol. 31, No. 10, pub. 1939, pp. 1284-88.